…

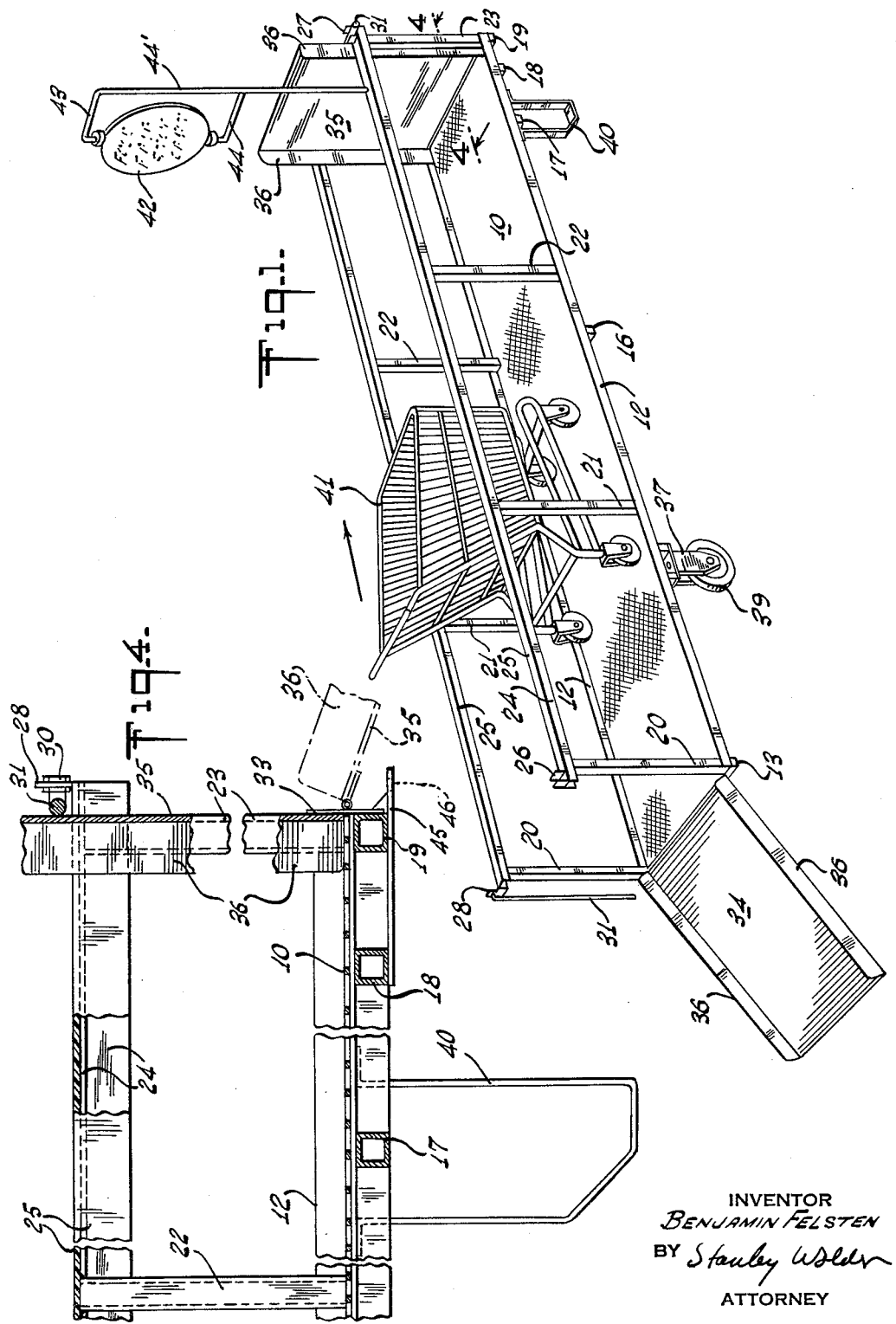

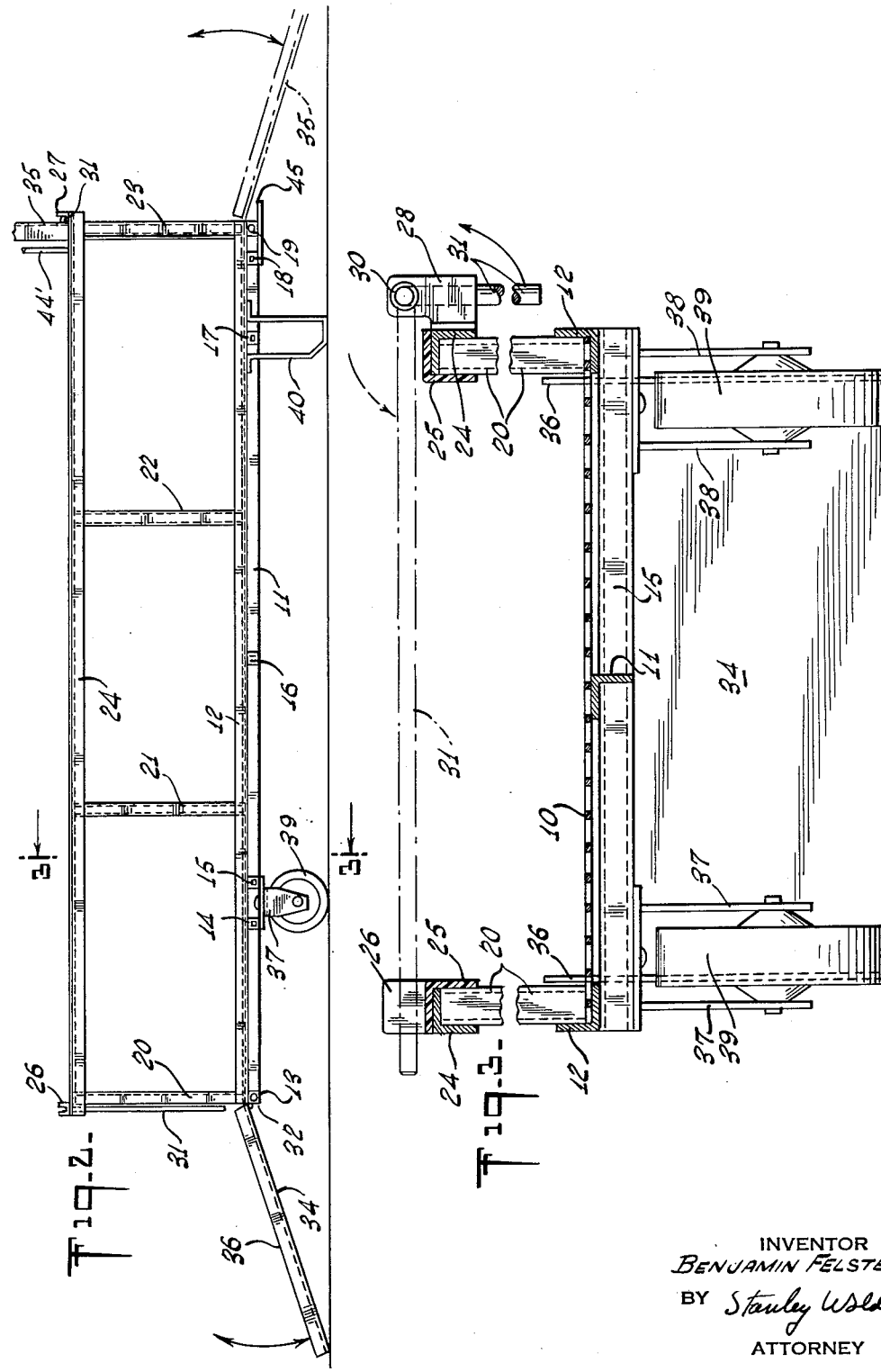

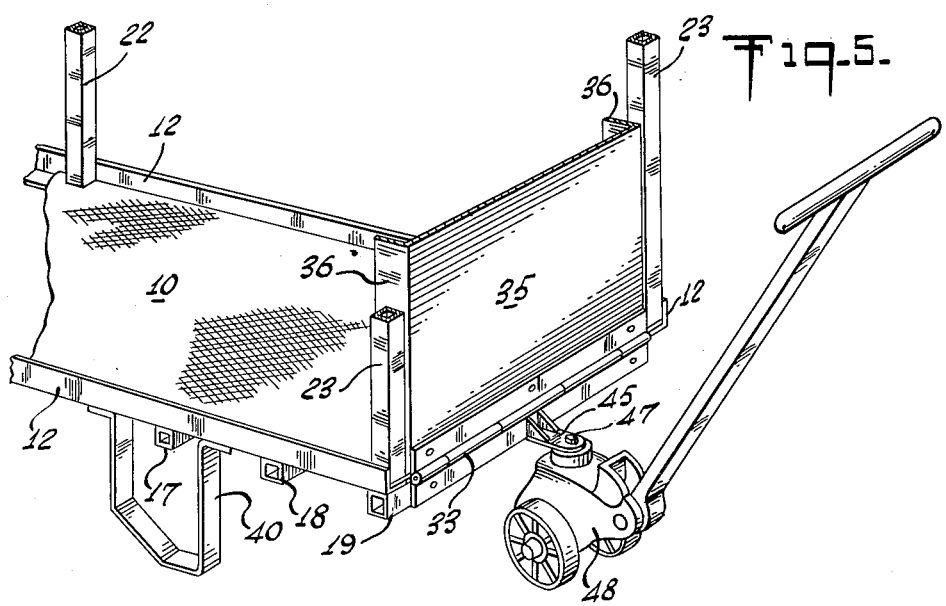
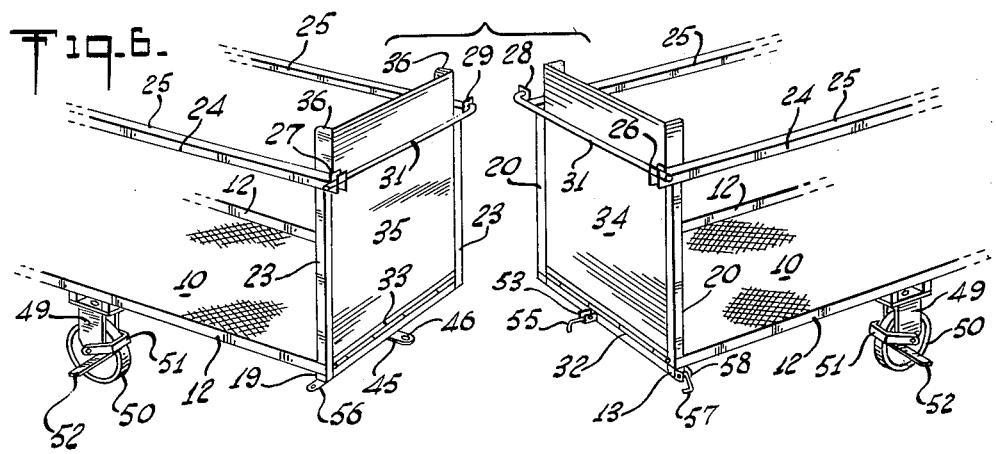
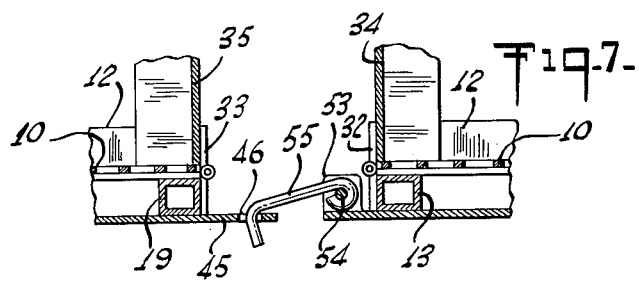

United States Patent Office 3,051,336  
Patented Aug. 28, 1962

3,051,336  
VEHICLE STORAGE AND TRANSPORTING MEANS  
Benjamin Felsten, Philadelphia, Pa., assignor to Food Fair Stores, Inc., Philadelphia, Pa., a corporation of Pennsylvania  
Filed Feb. 4, 1960, Ser. No. 6,784  
6 Claims. (Cl. 214—85)

The present invention relates to a vehicle storage and transporting means and more particularly to such means especially adapted for the parking or storage of shopping carts and the like and for their subsequent conveyance.

The major problem incident to the operation of a supermarket and the like in which shopping carts or other vehicles are employed and which vehicles are brought upon a parking lot in order to load the customer's cars, resides in the safe storage and retrieval of such carts or other vehicles. Currently, either no regular provision is made for such carts or spaces are marked off for their parking. In both cases, however, the net result is usually the abandoning by users of the carts at locations in various parts of the parking lots including parking spaces and lanes not intended to be so used, with the consequence that car traffic is impeded and carts are frequently seriously damaged. In addition, there is the difficulty that even if carts are placed within enclosures or left at places where they do not impede car traffic, it is still necessary to round up the carts and bring them back to the store premises for reuse.

It is the primary purpose of the present invention to provide a structure which may be employed to store carts and the like and which may then be employed to convey the stored carts without further handling to a predetermined place for reuse.

It is further object of the present invention to provide cart storage and retrieval means which may be readily placed about parking lots and other locations and yet readily transported to a central point to enable the reuse of the carts carried by the subject of the invention.

It is a still further object of the present invention to provide such storage and conveyance means which may be simply and inexpensively constructed but which will be sturdy and extremely practical for the use intended.

It is still another object of the present invention to provide such storage and conveyance means which may be readily linked both end to end and laterally with similar means to provide enlarged trains thereof for ready and economical transportation.

The above and other objects are achieved in a preferred form of the present invention which includes an elongated floor or platform upon which there is erected side railings and to both ends of which ramps are pivotally mounted, the underside of the platform being supported by large caster or wheels and skids, there being an attachment at at least one end of said platform for engagement by wheel supported jack means which may be employed as means to raise the platform from a skid or the like and pull the same in a desired direction.

The ramps may be maintained in a vertical position as tailgates by readily disengageable latch means and may be pivoted to a position extending from the platform to the ground to enable loading.

Other objects and a fuller understanding of the present invention may be had by referring to the following detailed description and claims, taken in conjunction with the accompanying drawings which illustrate preferred embodiments thereof, it being understood that the foregoing statement of the objects of the invention and the brief summary thereof is intended to generally explain the same without limiting it in any manner.

FIG. 1 is a perspective view of a device embodying the present invention showing a shopping cart loaded upon the conveyance.

FIG. 2 is a side elevational view thereof.

FIG. 3 is a sectional view taken along the lines 3—3 of FIG. 2.

FIG. 4 is an enlarged fragmentary sectional view thereof taken along the lines 4—4 of FIG. 1.

FIG. 5 is a fragmentary perspective view at one end of the conveyance.

FIG. 6 is a fragmentary view of two of the conveyances in position for linking.

FIG. 7 is an elevational sectional view through the means for linking conveyances.

Referring now to the drawings, the preferred form of the present invention there illustrated comprises a platform 10 preferably of expanded steel or the like which rests on a center beam 11 and on side channel members 12, the channel members being connected laterally at spaced intervals by hollow cross pieces 13, 14, 15, 16, 17, 18 and 19 of preferably square section. Of course, sheet metal or other flooring material may be employed in lieu of the expanded metal construction. Pairs of sandards 20, 21, 22 and 23 are mounted at spaced intervals to platform 10 so as to extend upwardly therefrom and are surmounted by angle members 24 which extend over the lateral margin of platform 10. Angle members 24 are in turn surmounted by plastic angle members 25 which lie atop angle members 24 and which have a wall extending downwardly within the vehicle so as to provide a railing and as to act as guide and restraining means in connection with the carts and other wheeled vehicles to be stored and carried within the conveyance. Plastic angle members 25 may be made of a strong scratch resistant plastic material to ensure long wear and to prevent in turn the scratching of carts and the like brought upon platform 10. At either end of railing 24 there is positioned upwardly opened clips 26 and 27 while at either end of railing 25 opposite said clips there are positioned hinge supports 28 and 29 which are generally U-shaped members, connected laterally to railing 25, the upper sections thereof being apertured and supporting therein a hinge pin 30 about which there is bent a latch bar 31 which may be pivoted from a downwardly extending rest position (see FIG. 1) to a horizontal position through an angle of 265° so as to be frictionally engaged by the clip members 26 and 27.

Hinges 32 and 33 are mounted to cross pieces 13 and 19 respectively and engage tailgates or ramps 34 and 35 respectively, said ramps being preferably formed of sheet metal bent at the edges to provide upwardly extending flanges 36; and toward the rear end of the conveyance there may be secured U-shaped wheel brackets 37 and 38 in which there may be journalled casters or wheels 39. Toward the forward end thereof there are mounted on either side of platform 10 skid brackets 40 which may be slightly shorter in height than the combined height of brackets 37 and 38 and wheels 39 journalled therein so as to maintain the front end of said conveyance in a slightly lower position relative the ground than the rear end thereof. This slight depression of the forward end tends to assist in loading shopping carts 41 or the like since a slight gravity feed is thereby provided.

A sign 42 may be pivotally supported between arms 43 and 44 connected to standard 44' so as to advise cart users of the location of the conveyance. Attached to forward cross piece 19 there is a forwardly extending leaf 45 which is bored to provide an aperture 46.

In use, wheeled vehicles such as shopping cart 41 are pushed up ramp 34 and forwardly along platform 10 to abut toward ramp 35. Such vehicles or carts are normally made so as to enable telescoping storage thereof and hence a relatively large number of such vehicles may be loaded upon the conveyance. After the last vehicle is so loaded, tailgate or ramp 34 is raised from the position shown in FIG. 1 to the position shown in FIG. 6 as by the engagement of leaf 45 by the pin 47 of a portable jack 48. After skid brackets 40 clear the ground the operator may then pull the conveyance to a central point.

Another embodiment of the present invention is shown in FIG. 6 wherein skid brackets 40 are replaced by pivotable wheel brackets 49 and wheels 50 journalled therein. Associated with said brackets and wheels is a brake mechanism consisting of bracket 51 which when disposed to the position as shown in FIG. 6 as by the pressure of a user's foot on foot bar 52 extending laterally therefrom, jams the bearing of wheel 50 in bracket 49 and prevents the rotation of said wheel. Said braking means may be simply released by raising lever 52. In order to form trains of such conveyances they may be connected together from end to end laterally. A simple means for connecting said devices is shown in FIG. 6 wherein there is secured to the rear cross piece 13 of one conveyance a U-shaped bracket 53, the arms of which are pierced to support a pivot pin 54 to which there is mounted a tongue 55 which is bent at its outer end so as to be engageable in aperture 46 of leaf 45 extending from the front end of another conveyance. Similar leaf and tongue arrangements may be secured laterally to end cross pieces as, for example, a laterally extending leaf 56 and a similar laterally extending tongue 57 pivotally mounted to laterally extending bracket 58. In such cases, if it is decided to connect conveyances side by side as well as end to end, they may be readily hooked to one another by the connecting means shown.

By the means described, a readily movable enclosure for shopping carts or the like has been provided which may be placed at desirable positions in a parking lot or other locations to which carts are brought. By the employment of the present invention, carts will be protected, traffic facilitated and the return of carts to a central point for reuse will be hastened.

Although the present invention has been described with a certain degree of particularity, it is understood that the present disclosure has been made only by way of example and that numerous variations may be employed without transcending the scope of the invention as hereinafter claimed.

What is claimed is
1. A storage vehicle for wheeled conveyances comprising a substantially rectangular platform, upstanding lateral restraining means mounted to said platform and extending along the sides thereof, a ramp-tailgate pivotally mounted to said platform at each of the ends thereof to move upwardly to close said vehicle and downwardly to permit wheeled conveyances to transit said respective ramp-tailgate wheel means mounted to the underside of said platform between a center and a first end thereof upon which the same may be transported, and skid-bracket means mounted between the center and the other end of the platform.

2. A storage vehicle as described in claim 1, one of said wheel and skid-bracket means being shorter in height than the other so that said platform is tilted downward toward the end nearest said shorter means.

3. A storage vehicle as described in claim 2 for use with a towing means, said skid-bracket means being said shorter means, and coupling means connected to the underside said platform at its end nearest said shorter means to detachably engage said towing means.

4. A storage vehicle as described in claim 1, and corresponding fastening means connected to each end thereof whereby confronting ends of such vehicles may be detachably connected.

5. A storage vehicle as described in claim 1, and corresponding fastening means connected to opposed sides thereof whereby confronting sides of such vehicles may be detachably connected.

6. A storage vehicle as described in claim 1 and corresponding fastening means connected to each end thereof and to opposed sides thereof whereby confronting ends and confronting sides of such vehicles may be detachably connected.

References Cited in the file of this patent
UNITED STATES PATENTS

| | | |
|---|---|---|
| 1,956,245 | Moorman et al. | Apr. 24, 1934 |
| 2,750,226 | Ash | June 12, 1956 |

FOREIGN PATENTS

| | | |
|---|---|---|
| 1,113,257 | France | Nov. 28, 1955 |
| 166,991 | Austria | Oct. 25, 1950 |